US010012069B2

(12) United States Patent
Gu et al.

(10) Patent No.: US 10,012,069 B2
(45) Date of Patent: Jul. 3, 2018

(54) METHOD OF TREATMENT DESIGN AND OPTIMIZATION OF SEQUENCED FRACTURING TECHNIQUE

(71) Applicant: SCHLUMBERGER TECHNOLOGY CORPORATION, Sugar Land, TX (US)

(72) Inventors: Hongren Gu, Sugar Land, TX (US); Xiaowei Weng, Katy, TX (US); Olga Kresse, Sugar Land, TX (US); Bruno Lecerf, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 495 days.

(21) Appl. No.: 14/530,632

(22) Filed: Oct. 31, 2014

(65) Prior Publication Data
US 2016/0123117 A1    May 5, 2016

(51) Int. Cl.
*G06G 7/48* (2006.01)
*E21B 47/06* (2012.01)
*E21B 43/26* (2006.01)
*C09K 8/60* (2006.01)

(52) U.S. Cl.
CPC .............. *E21B 47/065* (2013.01); *C09K 8/60* (2013.01); *E21B 43/26* (2013.01)

(58) Field of Classification Search
CPC .......... E21B 43/26; E21B 43/16; E21B 43/14; E21B 33/138; E21B 43/267; E21B 47/00; E21B 41/00; C09K 8/60; C09K 8/905; C09K 8/42
See application file for complete search history.

(56) References Cited

U.S. PATENT DOCUMENTS

| 6,795,773 | B2 * | 9/2004 | Soliman ................. E21B 43/26 166/250.1 |
| 9,027,641 | B2 * | 5/2015 | Alekseenko ............ E21B 43/26 166/250.1 |
| 9,121,272 | B2 * | 9/2015 | Potapenko ............. E21B 43/26 |
| 2006/0102345 | A1 | 5/2006 | McCarthy et al. |

(Continued)

OTHER PUBLICATIONS

Alekseenko, et al., "3D Modeling of Fracture Initiation From Perforated Noncemented Wellbore", SPE-151585-PA, Society of Petroleum Engineers, SPE Journal, vol. 18, Issue 3, Jun. 2012, 12 pages.

(Continued)

*Primary Examiner* — Kandasamy Thangavelu
(74) *Attorney, Agent, or Firm* — Michael L. Flynn; Rachel E. Greene; Robin Nava

(57) ABSTRACT

In one aspect, a method of optimizing a sequenced hydraulic fracturing treatment to be performed on a well includes predicting, based on a well model of the well and a hydraulic fracturing treatment schedule, a seal state of a perforation cluster. The method may further include updating, based on the predicted seal state, a pilling operation of a stage of the hydraulic fracturing treatment schedule. The method may further include modifying the sequenced hydraulic fracturing treatment schedule to be performed based on the updated pilling operation. The well model includes a geomechanical model of the well and a geological formation.

20 Claims, 10 Drawing Sheets

(56) References Cited

U.S. PATENT DOCUMENTS

| | | | |
|---|---|---|---|
| 2006/0113077 A1* | 6/2006 | Willberg | C09K 8/42 166/280.1 |
| 2008/0000639 A1* | 1/2008 | Clark | E21B 43/14 166/281 |
| 2008/0149329 A1* | 6/2008 | Cooper | E21B 43/267 166/250.01 |
| 2009/0145599 A1 | 6/2009 | Siebrits et al. | |
| 2010/0252268 A1* | 10/2010 | Gu | E21B 43/26 166/308.1 |
| 2011/0048719 A1* | 3/2011 | Baihly | E21B 43/16 166/305.1 |
| 2012/0150515 A1 | 6/2012 | Hariharan et al. | |
| 2013/0032350 A1 | 2/2013 | Potapenko et al. | |
| 2013/0140031 A1* | 6/2013 | Cohen | E21B 43/26 166/308.1 |
| 2013/0274149 A1* | 10/2013 | Lafitte | C09K 8/905 507/112 |
| 2013/0304444 A1 | 11/2013 | Strobel et al. | |
| 2013/0341030 A1* | 12/2013 | Brannon | C09K 8/60 166/308.2 |
| 2014/0067353 A1* | 3/2014 | Shelley | E21B 43/26 703/10 |
| 2014/0076544 A1* | 3/2014 | Lecerf | E21B 41/00 166/250.01 |
| 2014/0222405 A1 | 8/2014 | Lecerf et al. | |
| 2014/0278316 A1* | 9/2014 | Dusterhoft | E21B 43/26 703/10 |
| 2014/0338905 A1* | 11/2014 | Ersoz | E21B 47/00 166/280.1 |
| 2015/0159477 A1 | 6/2015 | Lecerf et al. | |
| 2015/0275607 A1* | 10/2015 | Kraemer | E21B 33/138 166/287 |
| 2016/0108713 A1* | 4/2016 | Dunaeva | E21B 43/267 166/280.2 |

OTHER PUBLICATIONS

Bryant, "Simulating refracturing treatments that employ diverting agents on horizontal wells", University of Texas at Austin, 2013, 180 pages.

Cox, et al., "Field Cases of Hydraulic Fracture Stimulation Diagnostics Using Fiber Optic Distributed Acoustic Sensing (DAS) Measurements and Analyses", SPE-164030-MS, Society of Petroleum Engineers, SPE Unconventional Gas Conference and Exhibition, Muscat, Oman, Jan. 28-30, 2013, 10 pages.

Ebel, et al., "Numerical Modeling of Multilayer Fracture Treatments", SPE-23982-MS, Society of Petroleum Engineers, Permian Basin Oil and Gas Recovery Conference, Midland, Texas, Mar. 18-20, 1992, 8 pages.

Gu, et al., "Computer Simulation of Multilayer Hydraulic Fractures", SPE 64789—International Oil and Gas Conference and Exhibition in China, Beijing, China, Nov. 7-10, 2000, 12 pages.

Potapenko, et al., "Barnett Shale Refracture Stimulations Using a Novel Diversion Technique", SPE 119636—SPE Hydraulic Fracturing Technology Conference, The Woodlands, Texas, 2009, 11 pages.

Weng, et al., "Modeling of Hydraulic-Fracture-Network Propagation in a Naturally Fractured Formation", SPE 140253—SPE Hydraulic Fracturing Technology Conference, The Woodlands, Texas, Jan. 24-26, 2011, pp. 1-18.

Wu, et al., "Modeling of Interaction of Hydraulic Fractures in Complex Fracture Networks", SPE 152052—SPE Hydraulic Fracturing Technology Conference, Feb. 6-8, 2012, pp. 1-14.

* cited by examiner

210

Example Sequenced Treatment Schedule

Segment 1
Operation 1: Perforate well section
- 0.5 inch diameter perforations
- 6 perforations tightly grouped
- Every 25 feet Operation 2: Pump well section
- 1000 barrels of fluid A
- adjust flow rate until well section pressure reaches 3750 psi Operation 3: Pill well section
- 100 barrels of fluid B
- 5% by volume bridging agent
- 25 barrels per hour Operation 4: Pump well section
- 1000 barrels of fluid A
- adjust flow rate until well section pressure reaches 4200 psi

FIG. 2D

METHOD OF TREATMENT DESIGN AND OPTIMIZATION OF SEQUENCED FRACTURING TECHNIQUE

BACKGROUND

Hydrocarbon fluids such as oil and natural gas are obtained from a subterranean geologic formation, commonly referred to as a reservoir, by drilling a well that penetrates the hydrocarbon-bearing formation. Once a wellbore is drilled, various forms of well completion components may be installed in order to control and enhance the efficiency of producing the various fluids from the reservoir.

FIG. 1 shows a diagram of an example well (100) near a geological formation (103). The well includes surface structures (101) such as a derrick and tanks for holding fluids. The well (100) further includes a borehole (102) and various completion components (104) such as bridge plugs or packers that isolate the borehole (102) into sections (105)-(107). A casing may also be present to strengthen the walls of the borehole. By isolating individual sections (105)-(107) of the well, each section (105)-(107) may be independently operated which in some cases enhances the production of hydrocarbon fluids.

Improvement of operations performed on individual sections (105)-(107) of the well may improve the production of the well.

SUMMARY

In one aspect, a method of optimizing a sequenced hydraulic fracturing treatment to be performed on a well includes predicting, based on a well model of the wellbore and a hydraulic fracturing treatment schedule, a seal state of a perforation cluster. The method may further include updating, based on the predicted seal state, a pilling operation of a stage of the hydraulic fracturing treatment schedule. The method may further include modifying the hydraulic fracturing treatment schedule to be performed based on the updated pilling operation. The well model includes a geomechanical model of the wellbore and a geological formation.

In one aspect, a method of modifying a sequenced hydraulic fracturing treatment being performed on a wellbore located on a geological formation includes estimating, based on a seismic measurement taken during a pumping operation of the sequenced hydraulic fracturing treatment, a modification of the geological formation. The method may further include predicting, based on a well model of the wellbore and a hydraulic fracturing treatment schedule associated with the sequenced hydraulic fracturing treatment, the modification of the geological formation. The method may further include modifying a to-be-performed pumping operation of the hydraulic fracturing treatment schedule based on the estimated modification and predicted modification, and hydraulically fracturing the wellbore based on the modified to-be-performed pumping operation. The well model includes a geomechanical model of the wellbore and the geological formation, the FIPC component model, and the FPM.

Other aspects and advantages of the disclosure will be apparent from the following description and the appended claims.

BRIEF DESCRIPTION OF DRAWINGS

Certain embodiments of the disclosure will hereafter be described with reference to the accompanying drawings. It should be understood, however, that the accompanying drawings illustrate the various implementations described herein and are not meant to limit the scope of various technologies described herein. The drawings show and describe various embodiments of the current disclosure.

FIG. 2(D) shows an example treatment schedule for a sequenced hydraulic fracturing treatment.

DETAILED DESCRIPTION

Specific embodiments will now be described with reference to the accompanying figures. In the following description, numerous details are set forth as examples. It will be understood by those skilled in the art that one or more embodiments may be practiced without these specific details and that numerous variations or modifications may be possible without departing from the scope. Certain details known to those of ordinary skill in the art are omitted to avoid obscuring the description.

Hydraulic fracturing is a method of modifying a geological formation, typically through the use of pressurized liquids. Modification of the geological formation may increase the production of hydrocarbon fluids from a well within the geological formation. For example, a hydraulic fracturing process may create fractures that extend from a wellbore into a geological formation. These fractures allow hydrocarbon fluids to flow into the wellbore and, in turn, be extracted from the well.

Figure 1:
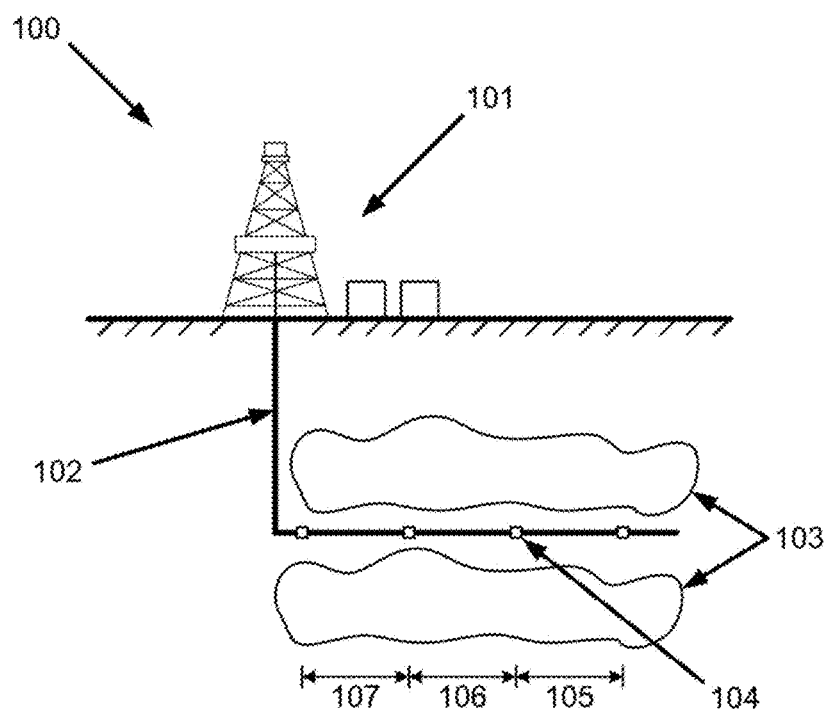
FIG. 1 shows an example of a well near a geological structure.

A hydraulic fracturing process is performed in accordance with a treatment schedule. The treatment schedule is a list of sequential operations to be performed. Each operation includes a set of operation parameters that quantify various aspects of the operation. If a well contains multiple sections, as depicted in FIG. 1, the treatment schedule may contain operations directed toward each section. Each set of operations listed in a treatment schedule directed toward a section is referred to as a segment. Thus, a treatment schedule on a multi-section well is divided into segments that include operations to be performed on individual sections of a well. During the hydraulic fracturing process, each section associated with the segment is isolated. A hydraulic fracturing treatment schedule is further clarified by example.

Figure 2A:
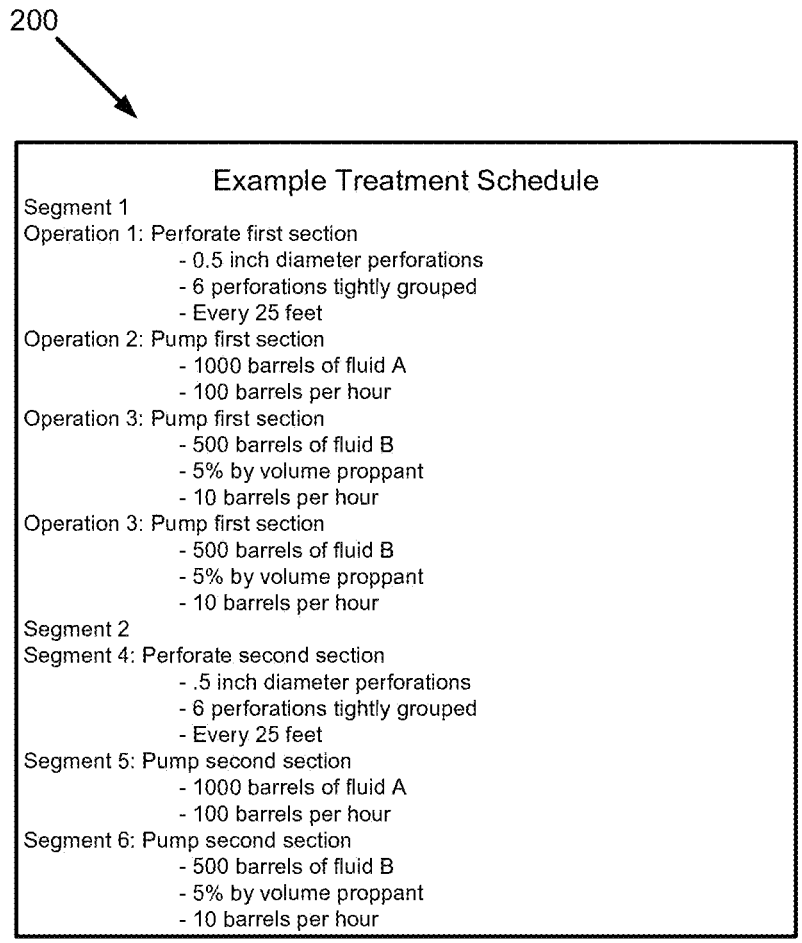
FIG. 2(A) shows an example treatment schedule.

An example treatment schedule (200) as known in the art is shown in FIG. 2(A). The example treatment schedule includes six operations divided into two segments. The operations of segment 1 are applied to the first section (105) and the operations of segment 2 are applied to the second section (106) of a well (100). Each operation describes the purpose of the operation, for example a perforation operation or a pumping operation, and also includes a set of operation parameters. For example, the operation parameters of operation 1 include the size and shape of the perforations, the number of perforations per grouping, and the spacing between groupings. As another example, operation 2 clarifies that it is a pumping operation, the volume and rate of the pumping, at the fluid to be pumped. The example treatment schedule (200) as shown in FIG. 2(A) is merely a simple example and one of ordinary skill in the art would recognize a treatment schedule in practice may be much more complex, include many more operations, and include additional operation parameters in each segment.

Figure 2B:
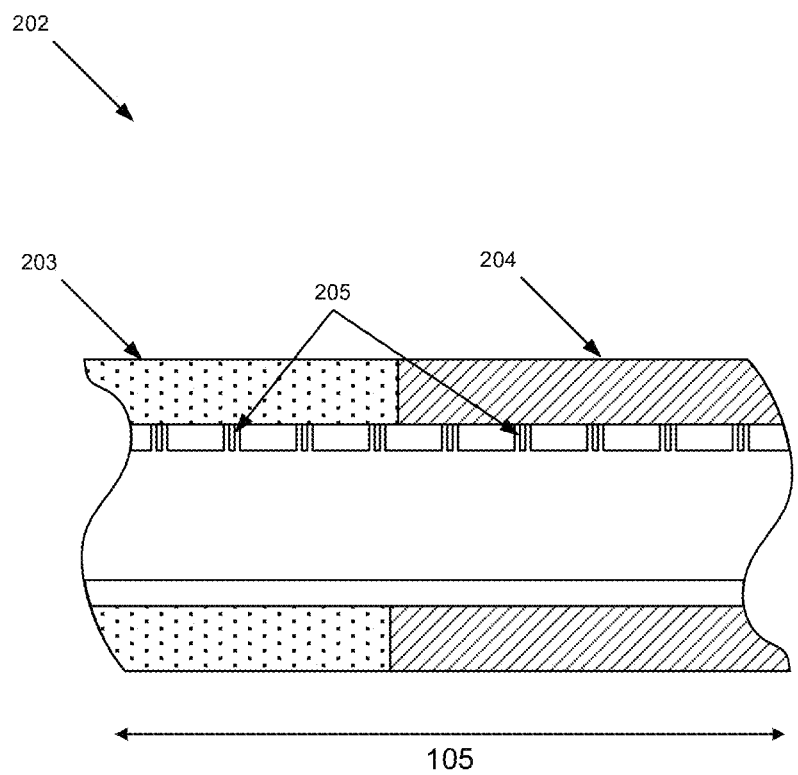
FIG. 2(B) shows an example section of a well.

In some cases, a section of a well may be located near a geological formation that has spatially varying material properties. For Example, FIG. 2(B) shows an expanded view (202) of the first section (105) of the well (100). Near the first section (105), the geological formation (103) includes a first geological area (203) and second geological area (204). The material properties of the first geological area (203) and second geological area (204) are different. Due to the difference in the material properties of each area, the perforation clusters (205) in each area will have different breakdown pressures. A breakdown pressure is the well section pressure that breaks through a perforation cluster (205) as part of a hydraulic fracturing procedure. Once the breakdown pressure is reached, the perforation cluster breaks down and the pressure is applied to the surrounding geological formation (103) which in turn causes fractures.

Once a first perforation cluster breakdown occurs, it may not be possible to continue to raise the pressure in the well section to breakdown other perforation clusters that have higher breakdown pressures. The first perforation cluster that breaks down may act as a leak which prevents raising the well section pressure sufficiently to breakdown the other perforation clusters (205). Thus, if different perforations clusters (205) have substantially different breakdown pressures it may not be possible to reach the well section pressures that breakdown the perforation clusters.

Figure 2C:
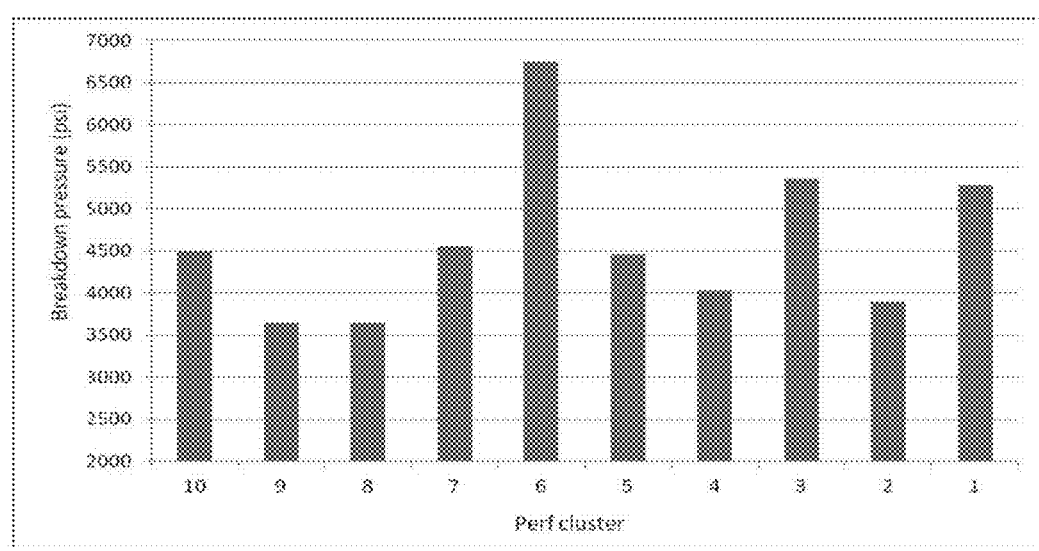
FIG. 2(C) shows an example plot of breakdown pressures for 10 perforation clusters.

FIG. 2C shows a plot of realistic breakdown pressures for 10 perforation clusters in a well section. As seen from the plot, the breakdown pressure for each perforation cluster varies from 3500 psi to 6750 psi. Thus, if a hydraulic fracturing procedure is applied to the well section containing these perforation clusters it may not be possible to raise the pressure above 3750 psi which would result in clusters 2, 8, and 9 breaking down.

In view of the variation of perforation cluster breakdown pressure, the sequenced hydraulic fracturing procedure, commonly known as BroadBand Sequence®, was developed. The sequenced hydraulic fracturing procedure allows the well section pressure to be raised to the pressure that breakdown the perforation clusters (205) contained in each section of the well. The sequenced fracturing technique adds additional operations to a hydraulic fracturing treatment schedule that temporarily seals perforation clusters that have been broken down. By temporarily sealing the perforation clusters, the pressure in the well section can be raised which in turn breaks down additional perforation clusters. The process is repeated until the perforation clusters have been broken down. The sequenced hydraulic fracturing treatment is further clarified by example.

FIG. 2(D) shows an example sequenced treatment schedule (210) for a single segment. At operation 1, the well section is perforated. Following the perforation, the well section is pumped to a pressure of 3750 psi in operation 2. Pumping to 3750 psi causes a first group of perforation clusters to breakdown. Once the first group of perforation clusters are broken down, fracture pumping operations such as Operations 2 and 3 shown in FIG. 2A are carried out to create fractures that will remain open once the pressure is decreased. A fluid is pumped into the well containing a bridging agent in operation 3. Bridging materials are referred to as a pill or pill material. The bridging material collects at each of the broken down perforation clusters that include fractures and create temporary seals. The temporary seals allow the pressure in the well section to be raised. Following the sealing of the broken down perforation clusters by the bridging material, additional fluid is pumped into the well section and the pressure is raised to 4200 psi. Raising the well section pressure to 4200 psi breaks down another set of perforation clusters. Pairs of pumping operations and pilling operations are referred to as stages. For example, operation 2 and operation 3 form a stage.

With reference to FIGS. 2(C) and 2(D), if operation 1 of FIG. 2(D) created the perforations with the measured breakdown pressures shown in FIG. 2(C), operation 2 would breakdown perforation clusters 8 and 9. Operation 3 would then seal clusters 8 and 9 which would enable the well section pressure to be raised to 4200 psi in operation 4. Raising the well section pressure to 4200 psi would then breakdown perforation clusters 2 and 4.

Thus, the sequenced hydraulic fracturing technique may be used to breakdown the perforation clusters in a well section. For example, the hydraulic fracturing schedule for the sequenced hydraulic fracturing technique could include stages directed toward each breakdown pressure of each perforation cluster. However, each segment in a hydraulic fracturing treatment schedule represents a cost in time, equipment, and materials. Adding more segments or using more materials in each segment may not be desirable.

In general, embodiments relate to a method for optimizing a sequenced hydraulic fracturing process. Additional embodiments relate to a method of modifying a sequenced hydraulic fracturing treatment being performed on a well.

A method of modeling a sequenced hydraulic fracturing technique process has been developed. The method of modeling predicts flow of fluids and pressures due to fluid flows within a well. Based on the predicted flow rates and pressures, the behavior of perforation clusters located within the wellbore is determined. Specifically, breakdown of the perforation cluster in response to a predicted pressure is determined and sealing of a broken down perforation cluster in response to a predicted flow rate of a fluid containing a bridging agent into the broken down perforation cluster is determined.

The method is based on forming a well model of the well. The well model incorporates a geomechanical model of the well and surrounding geological formation. The geomechanical model includes spatial information regarding the structure of the well, such as wellbore diameter, and the properties of the spatially varying material properties of the geological formation.

The method takes, as input, a hydraulic fracturing treatment schedule for a sequenced hydraulic fracturing process to-be-performed on the well. The method of modeling predicts flow rates and pressures, based on the well model and hydraulic fracturing treatment schedule, within the well. A hydraulic fracturing treatment schedule contains the sequential list of operations to be performed on the well. The method discretizes, in time, each operation in the hydraulic fracturing treatment schedule. Once discretized, fluid flow and fluid pressure within the well model is predicted throughout each operation.

Using the predicted flow rates and pressures, the sealing state of to-be-created perforation clusters listed in the hydraulic fracturing treatment schedule is determined. To make state determinations, the well model includes sub-models, which will be described in more detail, of to-be-created perforation clusters listed in the hydraulic fracturing treatment schedule.

The well model includes a first sub-model, referred to as a Fracture Initiation at a Perforation Cluster (FIPC) component model, for each perforation cluster listed in the hydraulic fracturing treatment schedule. FIPC component are used to model the breakdown behavior of each perforation cluster. When incorporated into the well model, the FIPC component models determine the breakdown state of each perforation cluster based on a predicted pressure due to pumping operations listed in the hydraulic fracturing perforation schedule.

The location of each perforation cluster is identified based on the hydraulic fracturing treatment schedule. For example, based on the example sequenced treatment schedule shown in FIG. 2(C), a FIPC component model would be placed 25 feet apart along the well model of the section of the well associated with the stage. An FIPC component model is automatically placed at each location of a perforation cluster in the well model.

Each FIPC component model determines the breakdown state of each perforation cluster based on a breakdown pressure. Each FIPC component model takes, as input, a breakdown pressure. The breakdown pressure of each FIPC component model may be determined from logs or by fluid injection tests in the field. If logs or field tests aren't available, the breakdown pressure may be estimated from empirical correlations from offset wells, e.g. test wells. The breakdown pressure may also be calculated using semi-analytical models based on solid mechanics, fracture mechanics, completion configuration, and fluid rheology as known in the art.

When a calculated pressure at the location of a FIPC component model in the well model reaches the breakdown pressure of the FIPC component model, the FIPC component model determines that the perforation cluster has broken down. For example, a pumping operation of a hydraulic fracturing treatment schedule may call for 1000 barrels of a fluid to be pumped into a well at 100 barrels per minute. Based on the pumping operation, the simulation may determine that after pumping 220 barrels of fluid the pressure at the location of the FIPC component model in the well model has reached the breakdown pressure. When the breakdown pressure is reached, the FIPC component model then determines the state of the perforation cluster as broken down.

In one or more embodiments, the well model calculates pressures and flow rate throughout the well based on rock mechanics, hydrodynamics, and time discretization. The structure of the well is incorporated into the well model based on the features in the well such as casings, tubings, and characteristics of the perforations such as the number, size, and depth. The properties of the geological formation are incorporated into the well model based on the priorities of the materials making up the geological formation such as Young's modulus, Poisson's ratio, fracture toughness, in-situ stress, and existing fracture distributions. The hydrodynamic behavior of the well is modeled based on the leak off properties of the fractures, such as the reservoir permeability, porosity, reservoir fluid properties, and fracturing fluid properties, and hydrodynamic properties of the pumped fluids, such as the rheology, friction pressure inside the casing, and proppants that modify the properties of the pumped fluids.

The well model further includes a second sub-model, referred to as a Fracture Plugging Model (FPM). If a FIPC component model determines the state of the associated perforation cluster as broken down, the FIPC component model is replaced by a FPM in the well model. Each FPM determines the seal state, e.g. if a broken down perforation cluster is temporarily sealed, of each perforation cluster. Each FPM takes, as input, a bridging correlation. The bridging correlation relates a predicted flow rate, of a pill material, into a broken down perforation cluster to a seal state. For example, operation 3 shown in FIG. 2D may cause a pilling material to flow into a broken down perforation cluster which may cause it to become temporarily sealed. The bridging correlation may be determined based on empirical correlations, laboratory experiments, or semi-analytical models.

Figure 2E:
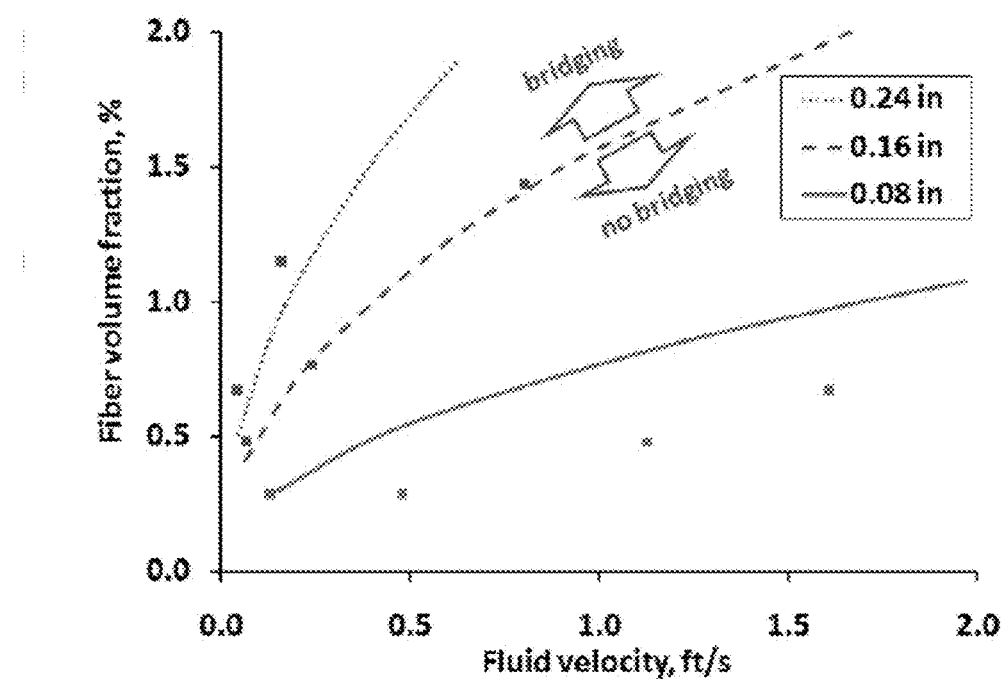
FIG. 2(E) shows an example bridging correlation.

A bridging correlation is further clarified by example. FIG. 2E shows an example bridging correlation in the form of a plot. The bridging correlation associates a flow rate of a bridging material into a perforation cluster with a sealing state of the perforation cluster. If a predicted flow rate of a fluid into a FPM model, exceeds the bridging correlation, the FPM model determines the seal state as sealed.

The plot shown in FIG. 3 has three lines. Each line is associated with the bridging behavior of a fluid, containing a proppant such as fiber, flowing through a perforation. Each line indicates a size of a perforation ranging from 0.08 inches up to 0.24 inches. The horizontal axis indicates a fluid velocity and the vertical axis indicates a proppant concentration by volume, in this case a fiber material. Each point on the plots represents a fluid, containing a specific proppant concentration, flowing through a perforation at a specific rate. If the point is above one of the three lines, the proppant will bridge the gap and cause the perforation to temporarily seal. If the point is below one of the three lines, the proppant will not bridge the gap and the perforation will not be temporarily sealed.

The well model predicts flow rates of fluids into each perforation cluster. The FPM model then checks to see if the predicted flow rate of the fluid will cause bridging. For example, a well model may predict a flow rate of a fluid containing 1% by volume proppant at a fluid velocity of 1 ft/s into a 0.08 inch perforation. In this example, the FPM model would then determine the seal state as sealed because the point (1 ft/s, 1%) on FIG. 2E is above the 0.08 inch line. In contrast, if the perforation was 0.16 inches and the same fluid was pumped and the same flow rate into the perforation was predicted, the FPM model would determine the seal state as not sealed because the point (1 ft/s, 1%) is below the 0.16 inch line.

The FPM model is also used to model the behavior of a broken down perforation cluster before it is sealed. For example, if a pumping operation causes a FIPC component model to determine the state of a perforation cluster as broken down the FIPC component model is replaced by a FPM model. Once a perforation cluster is broken down, fluids that are pumped into the well may escape into the surrounding geological structure until the perforation cluster is sealed.

To determine the flow rate of escaping fluids, the well model calculates flow rate distributions into the unsealed perforations represented by FPM models based on the principles of mass conservation and momentum conservation. Perforations that are determined as temporarily sealed are assumed to have a flow rate of zero. Each FPM model includes the diameter of the perforation and the well model includes the well structure leading to the FPM model as well as the properties of the geological formation on the other side of the FPM model. Thus, fluid flow through the perforation is determined which is also the rate of fluid flow out of the well and into the surround geological formation.

Utilizing the well model and the hydraulic fracturing treatment schedule, the method of modeling sequentially processes each operation listed in the hydraulic fracturing treatment schedule. For each operation, fluid flow rates and pressures throughout the well are predicted. Using each predicted pressure and flow rate, the breakdown state and seal state of each perforation cluster are determined.

Thus, the disclosed method of modeling a sequenced fracturing technique process takes into account the contribution of each operation of a hydraulic fracturing treatment schedule for a specific well and geological formation. The following methods incorporate the disclosed method of modeling a sequenced fracturing technique.

Figure 3A:
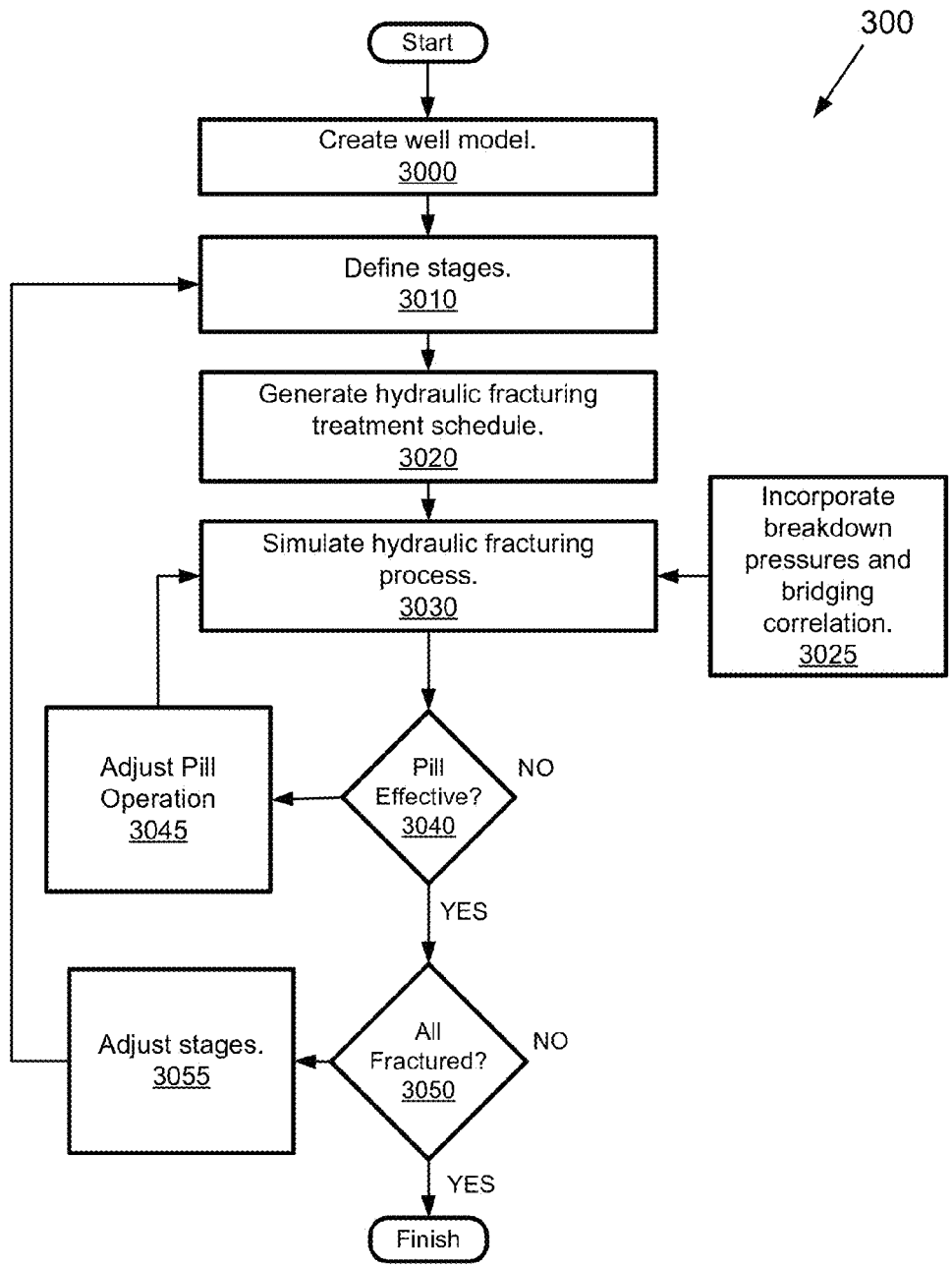
FIG. 3(A) shows a method of optimizing a hydraulic fracturing treatment schedule in accordance with one or more embodiments.

FIG. 3A shows a flow chart (300) of a method according to one or more embodiments. The method depicted in FIG. 3A may be used to optimize a sequenced fracturing technique in accordance with one or more embodiments. One or more items shown in FIG. 3A may be omitted, repeated, and/or performed in a different order among different embodiments.

At 3000, a well model is created. In one or more embodiments, the well model includes a geomechanical model of the well and surrounding geological formation. In one or more embodiments, the geomechanical model includes a three dimensional representation of the well such as the length and diameter of each section of the well. In one or more embodiments, the geomechanical model includes a three dimensional representation of any restrictions within the well, such as seats, that may impact fluid flow or fluid pressure throughout the well. In one or more embodiments, the geomechanical model includes a three dimensional representation of the properties of the geological formation surround the well such as the density or type of rock. In one or more embodiments, the structure of the well is incorporated into the well model based on the features in the well such as casings, tubings, and characteristics of the perforations such as the number, size, and depth. In one or more embodiments, the properties of the geological formation are incorporated into the well model based on the priorities of the materials making up the geological formation such as Young's modulus, Poisson's ratio, fracture toughness, in-situ stress, and existing fracture distributions.

At 3010, a series of stages are defined. As noted above, a stage is pair of pumping and pilling operations. In one or more embodiments, each stage is defined based on the breakdown pressure of each perforation cluster. By defining stages based on breakdown pressure, the perforation clusters may be broken down while minimizing the number of stages. As previously discussed, once a perforation cluster is broken down it is difficult to increase the pressure in the well section. Thus, by defining the stages based on breakdown pressure, groups of perforation clusters with similar breakdown pressures may be targeted for breakdown by each stage which in turn allows the perforation clusters to be broken down.

Figure 3B:
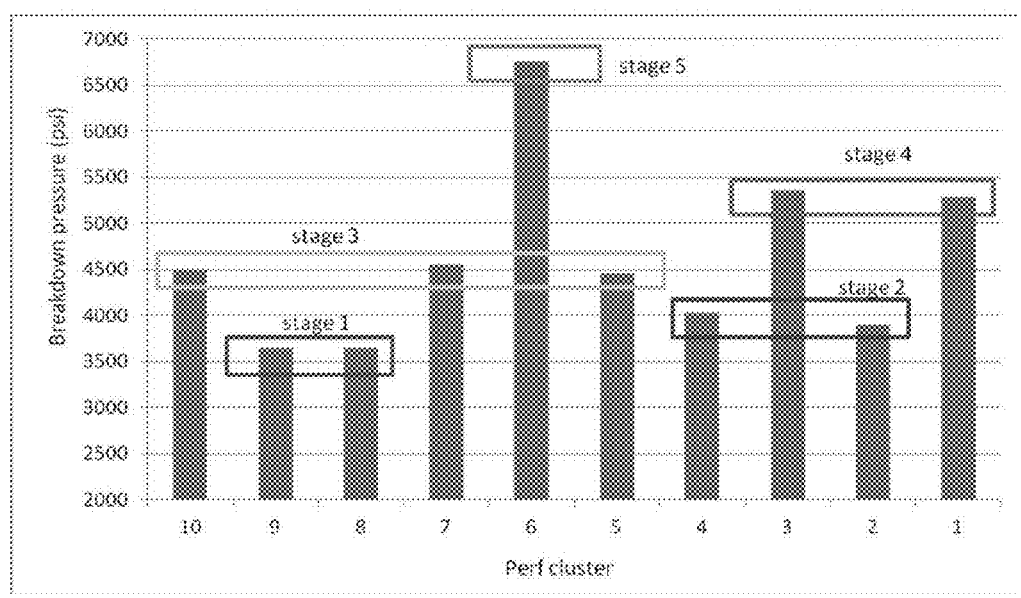
FIG. 3(B) shows an example of targeting perforation clusters based on breakdown pressure in accordance with one or more embodiments.

FIG. 3B shows an example method of targeting perforation clusters by stages. Perforation clusters 8-9 have been targeted by stage 1, e.g. stage 1 is designed to create a pressure of around 3750 psi. Perforation clusters 2 and 4 have been targeted by stage 2, e.g. stage 2 is designed to create a pressure of around 4000 psi after perforation clusters 8-9 have been temporarily sealed. Perforation clusters 5, 7, and 10 have been targeted by stage 3, e.g. stage 3 is designed to create a pressure of around 4500 psi after perforation clusters 2, 5, and 8-9 have been temporarily sealed. Perforation clusters 1 and 3 have been targeted by stage 4, e.g. stage 4 is designed to create a pressure of around 5500 psi. Perforation cluster 4 has been targeted by stage 5, e.g. stage 5 is designed to create a pressure of around 6750 psi.

Figure 3C:
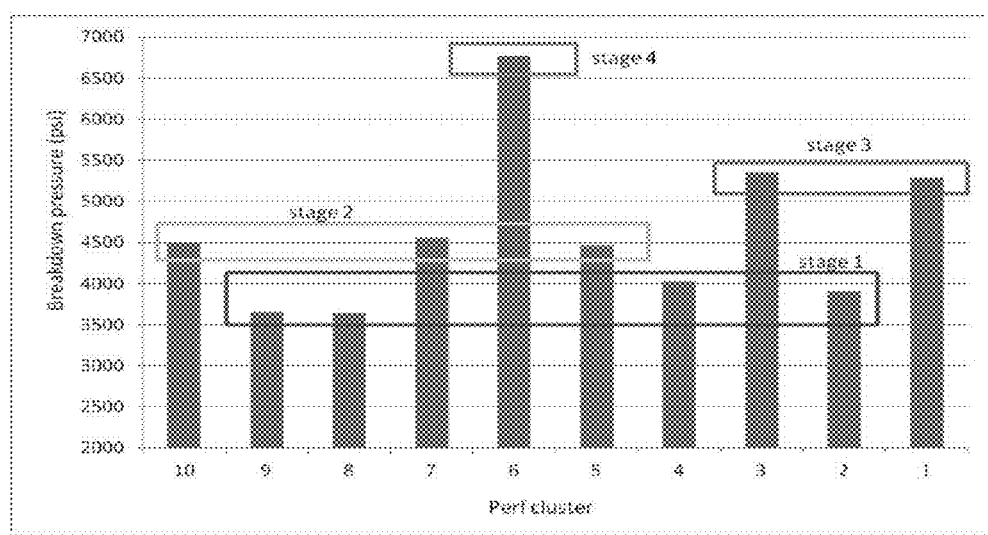
FIG. 3(C) shows a second example of targeting perforation clusters based on breakdown pressure in accordance with one or more embodiments.

FIG. 3C shows a second example method of targeting perforation clusters by stages. Perforation clusters 2, 4, and 8-9 have been targeted by stage 1, e.g. stage 1 is designed to create a pressure of around 4000 psi. Perforation clusters 5, 7, and 10 have been targeted by stage 2, e.g. stage 2 is designed to create a pressure of around 4500 psi. Perforation clusters 1 and 3 have been targeted by stage 3, e.g. stage 3 is designed to create a pressure of around 5500 psi. Perforation cluster 4 has been targeted by stage 4, e.g. stage 4 is designed to create a pressure of around 6750 psi.

At 3020, a hydraulic fracturing treatment schedule is generated based on the defined stages. In one or more embodiments, generating the hydraulic fracturing treatment schedule includes populating each operation of the hydraulic fracturing treatment schedules with operation parameters. In one or more embodiments, each pumping operation of each stage of the hydraulic fracturing treatment schedule is populated with operation parameters to reach a sufficient level of pressure to fracture the perforation clusters targeted by the stage as as is known in the art. In one or more embodiments, the corresponding pilling operation for each stage is populated with operation parameters to reach a sufficient pilling material flow rate to temporarily seal each broken down perforation cluster targeted by the stage as is known in the art.

At 3025, the well model is modified to incorporate the measured or computed breakdown pressures and bridging correlations. In one or more embodiments, the well model is modified by incorporating a FIPC component model and corresponding FPM model for each to-be-created perforation cluster in the hydraulic fracturing treatment schedule.

At 3030, the hydraulic fracturing process is simulated based on the well model and the hydraulic fracturing treatment schedule as previously described, up to a predetermined stage. In one or more embodiments, simulating includes sequentially predicting, for each operation of the hydraulic fracturing treatment schedule, flow rates and pressures throughout the modeled well. In one or more embodiments, the breakdown state and sealing state of each FIPC component model and FPM is determined. In one or more embodiments, when a FIPC component model determines a breakdown state as broken down, the FIPC component model is replaced with a FPM model.

At 3040, the effectiveness of the pilling operation of the predetermined stage is determined. In one or more embodiments, the effectiveness of the pilling operation is determined as effective if the perforation clusters, targeted by the predetermined stage, were temporarily sealed, e.g. the FPM models targeted by the stage determined the sealing state as temporarily sealed. If the pilling operation is determined as effective, the method proceeds to 3050. If the pilling operation is determined as not effective, the method proceeds to 3045.

At 3045, the pilling operation determined as not effective is modified to increase the effectiveness of the pilling operation. In one or more embodiments, modifying the pilling operation decreases the flow rate of the fluid used in the pilling operation. In one or more embodiments, modifying the pilling operation increases the quantity of bridging material contained in the fluid pumped in the pilling operation. Once the pilling operation is modified, the method proceeds to 3030.

At 3050, it is determined if the perforation clusters, targeted by the predetermined stage, are broken down, e.g. if the FIPC component models targeted by the predetermined stage have determined the breakdown state as broken down. If the perforation clusters are not broken down, the method proceeds to 3055.

At 3055, the stages are adjusted. In one or more embodiments, adjusting the stages increases the number of stages by one. Once the stages are adjusted, the method proceeds to 3010 where perforation clusters are targeted by the stages.

In one or more embodiment, the method of optimizing a sequenced fracturing technique as disclosed in FIG. 3 may be used to set the hydraulic fracturing treatment schedule for a well while minimizing the number of stages and quantity of pill material used in each pilling operation of each stage of the hydraulic fracturing treatment schedule.

Figure 4:
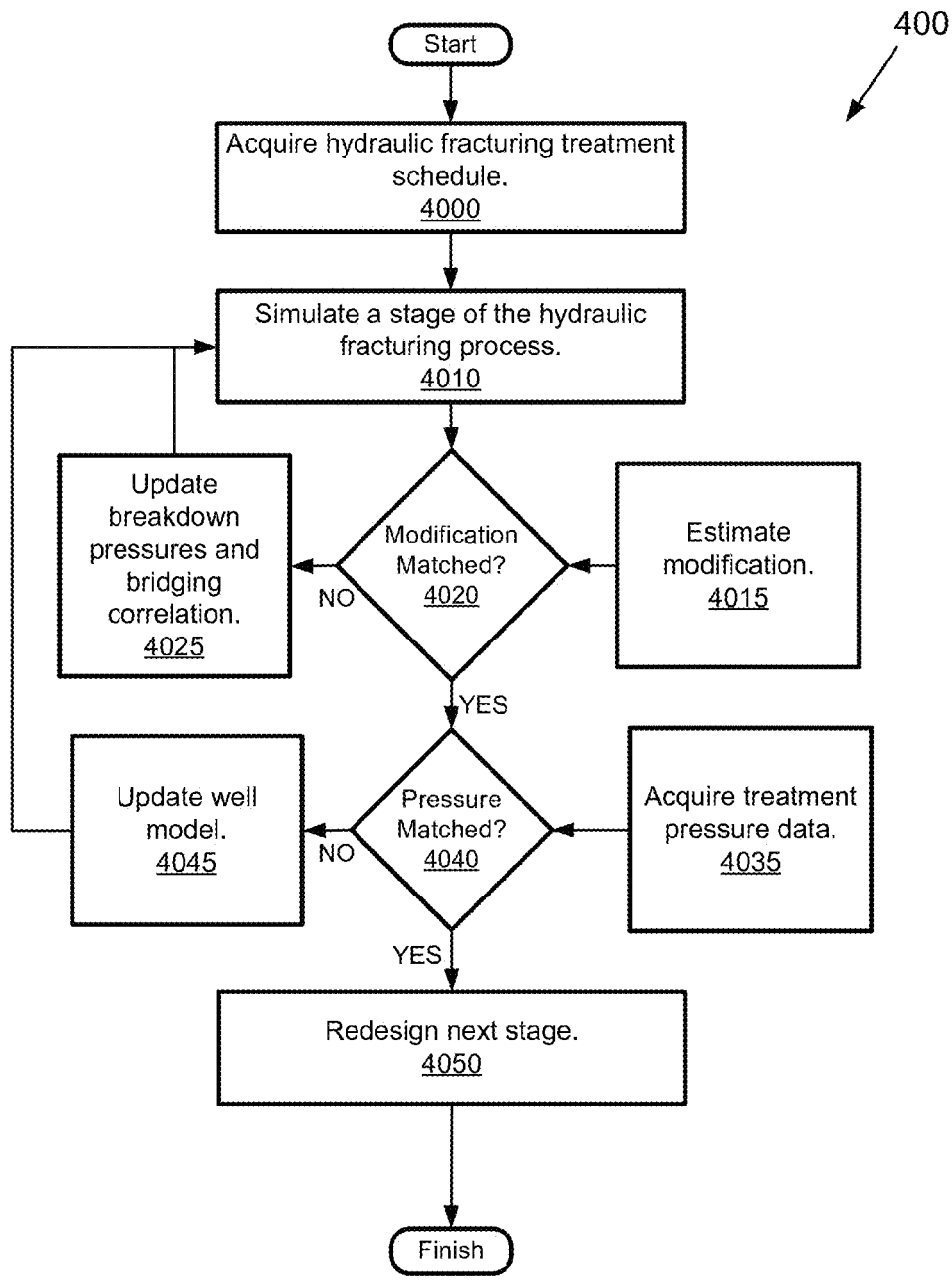
FIG. 4 shows a method to evaluate and modify a hydraulic fracturing schedule in accordance with one or more embodiments.

FIG. 4 shows a flow chart (400) of a method according to one or more embodiments. The method depicted in FIG. 4 may be used to evaluate and modify a hydraulic fracturing schedule in accordance with one or more embodiments. One or more items shown in FIG. 4 may be omitted, repeated, and/or performed in a different order among different embodiments.

At 4000, a hydraulic fracturing treatment schedule for a hydraulic fracturing process that is partially completed is acquired.

At 4010, the hydraulic fracturing process is simulated sequentially until a predetermined stage in the hydraulic fracturing treatment schedule is reached. A modification to the geological formation caused by the predetermined stage of the hydraulic fracturing treatment schedule is then determined based on the simulation, e.g. breakdown of the perforation clusters targeted by the predetermined stage. Additionally, a simulated pressure caused by the predetermined stage is also determined.

At 4015, a modification to the geological formation based on acquired geological formation data is estimated. In one or more embodiments, the geological formation data is microseismic data, distributed acoustic sensing data, or distributed temperature sensing data captured during the hydraulic fracturing process performed during the predetermined stage.

At 4020, the estimated modification to the geological formation during the predetermined stage and the simulated modification during the predetermined stage are compared. If the modifications do not match, it is assumed that the breakdown pressures and the bridging correlations used in the FIPC component models and the FPMs do not match the actual breakdown pressures and bridging correlations of the perforation clusters, and the method proceeds to 4025. If the modifications do match, the method proceeds to 4040.

At 4025, the breakdown pressures and bridging correlations are parametrically studied. The breakdown pressures and bridging correlations are parametrically studied by sequentially varying the values for breakdown pressures and bridging correlations in a number of simulations. In each simulation, the modification of the geological formation is predicted and then compared to the estimated modification. The parametric study proceeds until the predicted modification and estimated modification match, e.g. the breakdown state of each FIPC component model matches the actual breakdown state in the estimated modification. Thus, the breakdown pressures and bridging correlations of the FIPC component models and the FPMs in the well model are updated based on measured data.

At 4035, the treatment pressure data from the hydraulic fracturing process during the predetermined stage is acquired. For example, the treatment pressure data may be bottom hole pressure data.

At 4040, the acquired treatment pressure data is compared to the predicted pressure data. If the pressures do not match, it is assumed that a portion of the well model does not match the well, and the method proceeds to 4045. If the pressures do match, the method proceeds to 4050.

At 4045, the well model is parametrically studied. The well model is parametrically studied by sequentially varying the values for the perforation diameter or other characteristic that one of ordinary skill in the art would select for study. Other characteristics of the well model that may be varied include the properties of the geological formation surrounding the well such as the structure of natural or pre-existing fractures in the geological formation, in-situ stresses of the geological formation such as the magnitude and distribution in different formation layers, and a near wellbore pressure drop. In each simulation, the treatment pressure is calculated and then compared to the acquired treatment pressure. The parametric study proceeds until the predicted pressure and estimated treatment pressure match. Thus, the well model is updated based on measured data.

At 4050, the hydraulic fracturing treatment schedule is updated based on the updated well model. In one or more embodiments, the hydraulic fracturing treatment is updated by the process illustrated in FIG. 3. When updating the hydraulic fracturing treatment schedule by the process illustrated in FIG. 3, the stages after the predetermined stage are simulated and modified. For example, a to-be-performed pumping operation in a hydraulic fracturing treatment schedule may be modified based on the estimated modification and predicted modification determined in 4020. In another example, a to-be-performed pumping operation in a hydraulic fracturing treatment schedule may be modified based on the acquired treatment pressure data and predicted treatment pressure data determined in 4040. In one or more embodiments, modifying the pumping operation results in a modified treatment schedule that is subsequently used to hydraulically fracture the well.

In one or more embodiment, the method of modifying a hydraulic fracturing treatment schedule shown in FIG. 4 may be used to reduce differences between part of a well model and a well. Further, an in process hydraulic fracturing procedure may be updated based on the well model. By updating the hydraulic fracturing procedure according to data collected during the hydraulic fracturing process, future stages of the hydraulic fracturing process may have a higher rate of success due to the updates.

While the above has been described with respect to a limited number of embodiments, those skilled in the art, having the benefit of this disclosure, will appreciate that other embodiments can be devised which do not depart from the scope as disclosed herein. Accordingly, the scope should be limited by the attached claims.

What is claimed is:
1. A method of optimizing a sequenced hydraulic fracturing treatment to be performed on a wellbore, comprising:
predicting a seal state of a perforation cluster using a well model of the wellbore and a hydraulic fracturing treatment schedule;

updating a pilling operation of a stage of the hydraulic fracturing treatment schedule, using the predicted seal state;

modifying the hydraulic fracturing treatment schedule using the updated pilling operation, wherein the well model comprises a geomechanical model of the wellbore and a geological formation; and performing the hydraulic fracturing treatment based on the modified treatment schedule.

2. The method of claim 1, wherein updating the pilling operation comprises:

predicting, based on the hydraulic fracturing treatment schedule and the well model, an injection rate of a pilling material, and decreasing the injection rate of the pilling material in response to the seal state being determined as unsealed.

3. The method of claim 1, further comprising:

predicting, based on the well model and the hydraulic fracturing treatment schedule, a breakdown state of the perforation cluster, and adding, based on the breakdown state of the perforation cluster, a new stage to the hydraulic fracturing treatment schedule, wherein the new stage comprises a new pumping operation and a new pilling operation.

4. The method of claim 3, wherein the well model further comprises a Fracture Initiation at a Perforation Cluster (FIPC) component model of the perforation cluster that determines the breakdown state of the perforation cluster based on a predicted pressure due to a pumping operation of the hydraulic fracturing treatment schedule and a measured breakdown pressure of the perforation cluster.

5. The method of claim 4, wherein the well model further comprises a Fracture Plugging Model (FPM) that determines the seal state of the perforation cluster based on a predicted flow rate due to the pilling operation and a measured bridging correlation.

6. The method of claim 5, wherein the FIPC component model is replaced by the FPM in response to the FIPC component model determining the breakdown state as broken down.

7. The method of claim 5, wherein the bridging correlation comprises a lookup table that associates the pilling operation comprising a set of pilling parameters with the seal state of the perforation cluster.

8. The method of claim 7, wherein the set of pilling parameters comprises a pilling fluid flow rate, a pilling agent concentration, and a perforation diameter.

9. The method of claim 1, further comprising:

hydraulically fracturing the wellbore based on the hydraulic fracturing treatment schedule.

10. A method of performing a sequenced hydraulic fracturing treatment on a wellbore located on a geological formation, comprising:

estimating a modification of the geological formation based on a seismic measurement taken during a pumping operation of the sequenced hydraulic fracturing treatment;

predicting the modification of the geological formation based on a well model of the wellbore and a hydraulic fracturing treatment schedule associated with the sequenced hydraulic fracturing treatment;

modifying a to-be-performed pumping operation of the hydraulic fracturing treatment schedule based on the estimated modification and predicted modification; and hydraulically fracturing the wellbore based on the modified to-be-performed pumping operation, wherein the well model comprises a geomechanical model of the wellbore and the geological formation, a Fracture Initiation at a Perforation Cluster (FPIC) component model, and a Fracture Plugging Model (FPM).

11. The method of claim 10, further comprising:

updating, based on the estimated modification and the predicted modification, the FIPC component model that determines a breakdown state of a perforation cluster and the FPM that determines a seal state of the perforation cluster.

12. The method of claim 11, wherein updating the FIPC component model and the FPM comprises:

determining a modification matching state of the estimated modification and the predicted modification, modifying, based on the modification matching state, a breakdown pressure of the FIPC component model that associates the breakdown pressure with the breakdown state, and modifying, based on the modification matching state, a bridging correlation of the FPM that associates a pilling operation with the seal state and the lookup table of the FPM that associates the pilling operation comprising a set of pilling parameters with the seal state.

13. The method of claim 12, further comprising:

measuring, during a performed operation of the sequenced hydraulic fracturing treatment, a pressure, predicting, based on the well model and the hydraulic fracturing treatment schedule, the wellbore pressure, and updating, based on the measured pressure and the predicted pressure, the geomechanical model.

14. The method of claim 13, further comprising:

updating, based on the updated FIPC component model, the updated FPM, and the updated geomechanical model, a to-be-performed stage of the hydraulic fracturing treatment schedule, performing, based on the updated to-be-performed stage, the sequenced hydraulic fracturing treatment.

15. The method of claim 14, wherein the FIPC component model determines the breakdown state of the perforation cluster by comparing the predicted pressure and the breakdown pressure.

16. The method of claim 15, wherein the FPM determines the seal state of the perforation cluster based on a set of pilling parameters of the pilling operation and a predicted flow rate.

17. The method of claim 16, wherein the FIPC component model is replaced by the FPM in response to the FIPC component model determining the breakdown state as broken down.

18. The method of claim 16, wherein the set of pilling parameters comprises a pilling agent concentration and a perforation diameter.

19. The method of claim 10, wherein the updated geomechanical model comprises:

determining a pressure matching state of an estimated treatment pressure and a predicted wellbore pressure; and modifying, based on the pressure matching state, a perforation diameter of the geomechanical model.

20. The method of claim 10, wherein the seismic measurement is one selected from the group containing a microseismic measurement, a distributed acoustic sensing measurement, and a distributed temperature sensing measurement.

* * * * *